June 5, 1956 G. W. KEAN 2,748,663
SCREW THREADING MACHINES
Filed Dec. 4, 1950 6 Sheets-Sheet 1

INVENTOR
GEORGE W. KEAN
BY Joseph K. Schofield
ATTORNEY

INVENTOR
GEORGE W. KEAN
BY Joseph M. Schofield
ATTORNEY

June 5, 1956   G. W. KEAN   2,748,663
SCREW THREADING MACHINES
Filed Dec. 4, 1950   6 Sheets-Sheet 5

START OF THREAD

STRAIGHT PORTION OF THREAD

POINTING PORTION OF THREAD

INVENTOR
GEORGE W. KEAN
BY Joseph H. Schofield
ATTORNEY

June 5, 1956   G. W. KEAN   2,748,663
SCREW THREADING MACHINES
Filed Dec. 4, 1950   6 Sheets-Sheet 6

INVENTOR
GEORGE W. KEAN
BY Joseph N. Schofield
ATTORNEY

United States Patent Office 2,748,663
Patented June 5, 1956

2,748,663

SCREW THREADING MACHINES

George W. Kean, Granby, Conn.

Application December 4, 1950, Serial No. 199,126

4 Claims. (Cl. 90—11.54)

This application relates to a machine for completely forming the threads on wood screws, including the shank portion and pointed end of the screw. More particularly the invention relates to a screw threading machine employing a milling cutter rotating at high speed and traversing the screw axially in timed relation to the rotation of the screw being threaded during the threading operation, the cutter being movable transversely toward the axis of the work blank simultaneously with its axial movement during its operation to form the threaded point of the screw.

A principal object of the invention is to provide a high speed threading machine particularly designed for operating on wood screws to completely mill the thread and form the threaded pointed end during a single traverse of the thread forming cutter along the entire length of the screw blank.

A feature of importance of the invention is that the work carrying spindle may, at the beginning of the cycle of operation of the machine, receive and clamp a screw by chuck jaws engaging over its head; and a milling cutter, rotated at high speed and actuated axially during and in time relation to its rotation, many simultaneously be moved toward the axis of rotation of the screw during its axial movement in one direction in accordance with the contour of a screw to completely thread the screw and form its pointed threaded end.

Another principal object of the invention is to complete the threading operation of a conventional wood screw during a single traverse of the cutter axially of the screw being threaded, this traversing movement finishing the threaded length of the screw of uniform diameter and its pointed threaded end.

Another object of the invention is to provide means for separating the completed screws as they are released by the chuck from the cuttings formed during the threading operation.

And finally it is an object of the invention to provide an efficient controlling mechanism for successively actuating the operative parts of the machine in accordance with a pre-determined cycle and at an efficient rate of operation, operation of the machine being stopped if any mechanism fails to complete its operation or if a blank is not in position on the spindle when the cycle is initiated.

With the above and other objects in view, the invention may include the features of construction and operation set forth in the following specification and illustrated in the accompanying drawings.

In the accompanying drawings annexed hereto and forming a part of this specification, I have shown the invention embodied in a fully automatic wood screw threading machine to completely thread the shank and point of the screw but it will be understood that the invention can be otherwise embodied and that the drawings are not to be construed as defining or limiting the scope of the invention, the claims appended to this specification being relied upon for that purpose.

Figure 3:
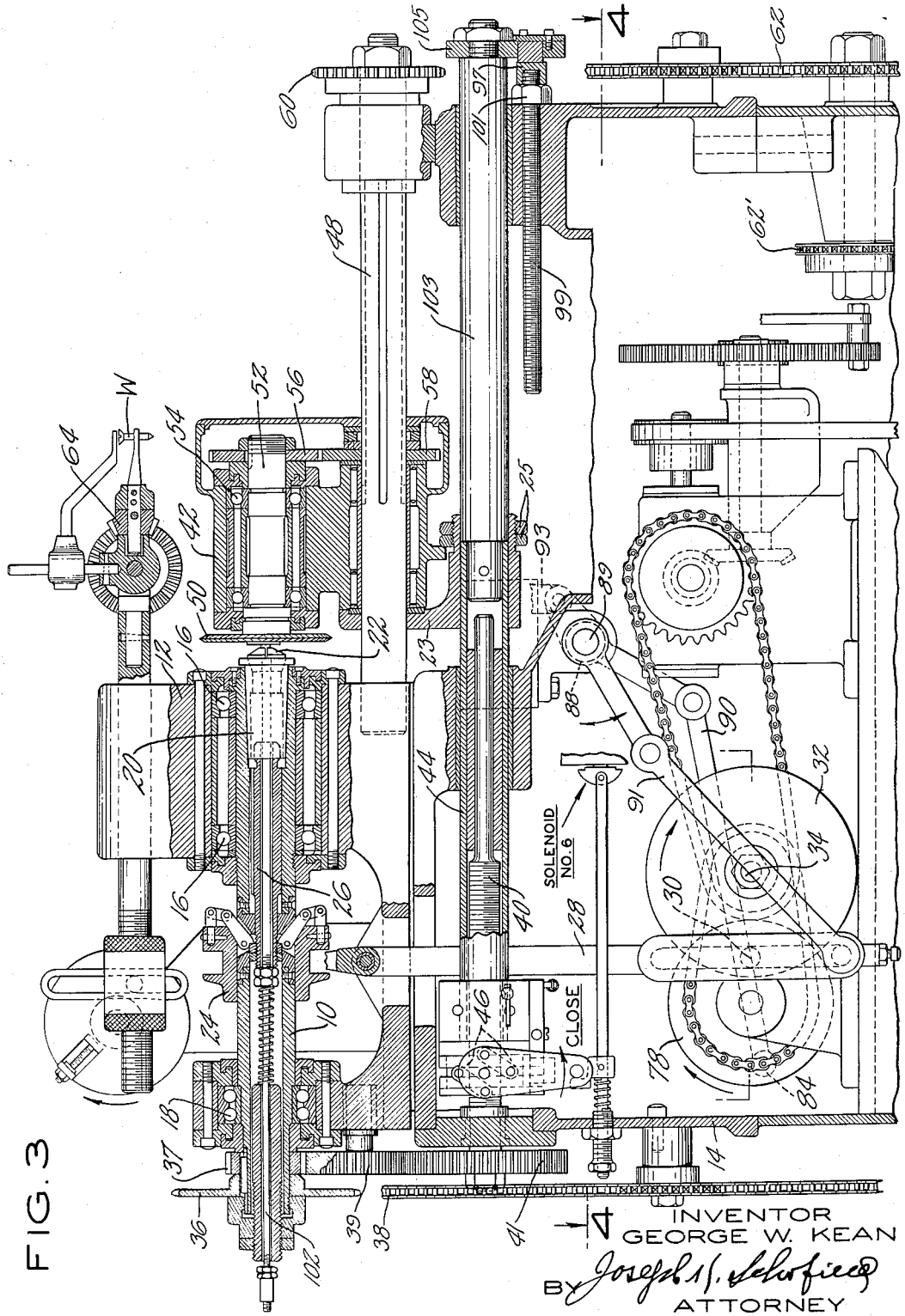
Fig. 3 is a front elevation in section on an enlarged scale showing some of the principal operative parts of the machine.

Referring more in detail to the figures of the drawings and first to Fig. 3, it will be seen that there has been provided a work spindle 10 rotatably mounted within a headstock 12. The headstock 12 may be mounted on or form an integral casting with the base 14 and has a pair of spaced antifriction bearings 16 in aligned horizontal positions by which the spindle is mounted for rotation at high speed. Supplementing these bearings 16 are additional bearings 18 for the spindle 10 adjacent the tail end of the headstock. The spindle 10 is therefore mounted for rotation within headstock 12 at a constant operative speed on a fixed axis. Within the forward end of the spindle 10 is inserted a collet type chuck 20 having opposed chuck jaws 22 adapted to engage a screw shank over the head of the screw and being movable to a releasing or open position to free the finished screw at the end of the threading operation. The operation of the chuck 20 is such that a blank may be mounted in operative position co-axially of the spindle 10 by mechanically operated transfer means during continued rotation of the spindle.

To actuate these chuck jaws 22 a circumferentially grooved member 24 slidably mounted on the spindle 10 is provided for rotation therewith. The operation of this jaw operating member 26 by axial movement of the grooved member 24 is effected in the usual manner by toggle linkage connecting the grooved member 24 to the draw bar 26 attached to and forming a part of the chuck. In closed position of the arms the toggle linkage is in a self-locking position. The operation of the grooved member 24 back and forth on the spindle 10 to open and close the chuck is in timed relation to the axial and other movements of the cutter head and will presently be described. For the present it may be said that this axial movement of the grooved member 24 is effected by oscillation of a vertical arm 28 the upper end of which is in engagement with the groove of the member 24. The lower end of the arm 28 is engaged by a crank pin 30 on a disk 32 mounted on the end of a shaft 34 (see Figs. 3 and 4). By rotation of the shaft 34 through approximately one-half a revolution the arm 28 may be moved from one position to another. The mechanism to time the rotation of the shaft 34 and to limit its movement to one-half a revolution will be presently described.

To rotate the work spindle 10 at an operative or cutting speed, a sprocket wheel 36 is mounted on the extreme end of the spindle which may be driven by means of chains 38 and 38' from a countershaft 72 within the base 14 drivingly connected through connections to the motor 66. (See Figs. 1 and 3.)

On the spindle 10 adjacent the sprocket wheel 36 and keyed to the spindle with the sprocket wheel by means of a suitable key is a driving gear 37 for rotating a lead screw 40 mounted below the spindle 10 and extending parallelly to the spindle. Between gears 37 and gear 41 on the lead screw 40 is an idler gear 39. Rotation of the lead screw 40 is used for moving the cutter head 42 (presently to be more fully described) in one direction longitudinally in timed relation to the rotative movement of the spindle. By selecting suitable gears for driving the lead screw 40 from the work spindle 10 or selecting different lead screws, the amount of axial movement of the cutter head 42 per revolution of the work spindle 10 may be widely varied for different sizes and types of screws. To engage and disengage the lead screw 40 with a tubular member 44 surrounding the screw 40 half-nuts 46 are mounted on the tubular member 44 surrounding the lead screw 40. A solenoid No. 6 shown in Fig. 3 is provided which will presently be described by which the half-nuts are opened and closed. The sleeve 44 as shown in Fig. 3 is keyed to a bracket member 23 against which the cutter head 42 abuts and by which it is permitted to oscillate. Lock nuts 25 one of which bears against a flange on the cutter head restrain the head 42 against axial movement relative to the bracket 23.

Figure 11:
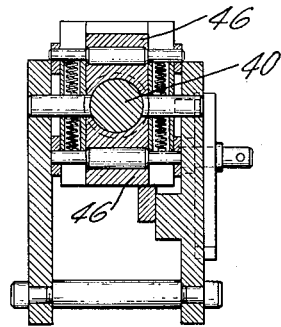
Fig. 11 is a traverse sectional view of the lead screw engaging half-nuts shown in Fig. 10.
Figure 12:
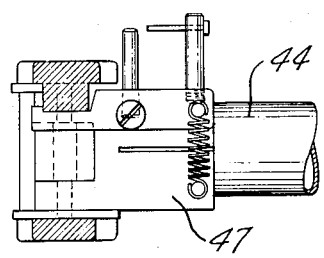
Fig. 12 is a bottom view of the parts shown in Fig. 11.

The rotation of the work spindle 10 may be continuous when motor 66 and countershaft 72 are rotating as it is not necessary to stop its rotation during the loading and unloading operations. Also the lead screw 40 driven from the work spindle 10 may be continuously operated for the reason that the movement of the cutter head 42 axially of the work blank takes place only when the half-nuts 46 are closed and in engagement with the lead screw 40 (see Figs. 3 and 11).

Figure 4:
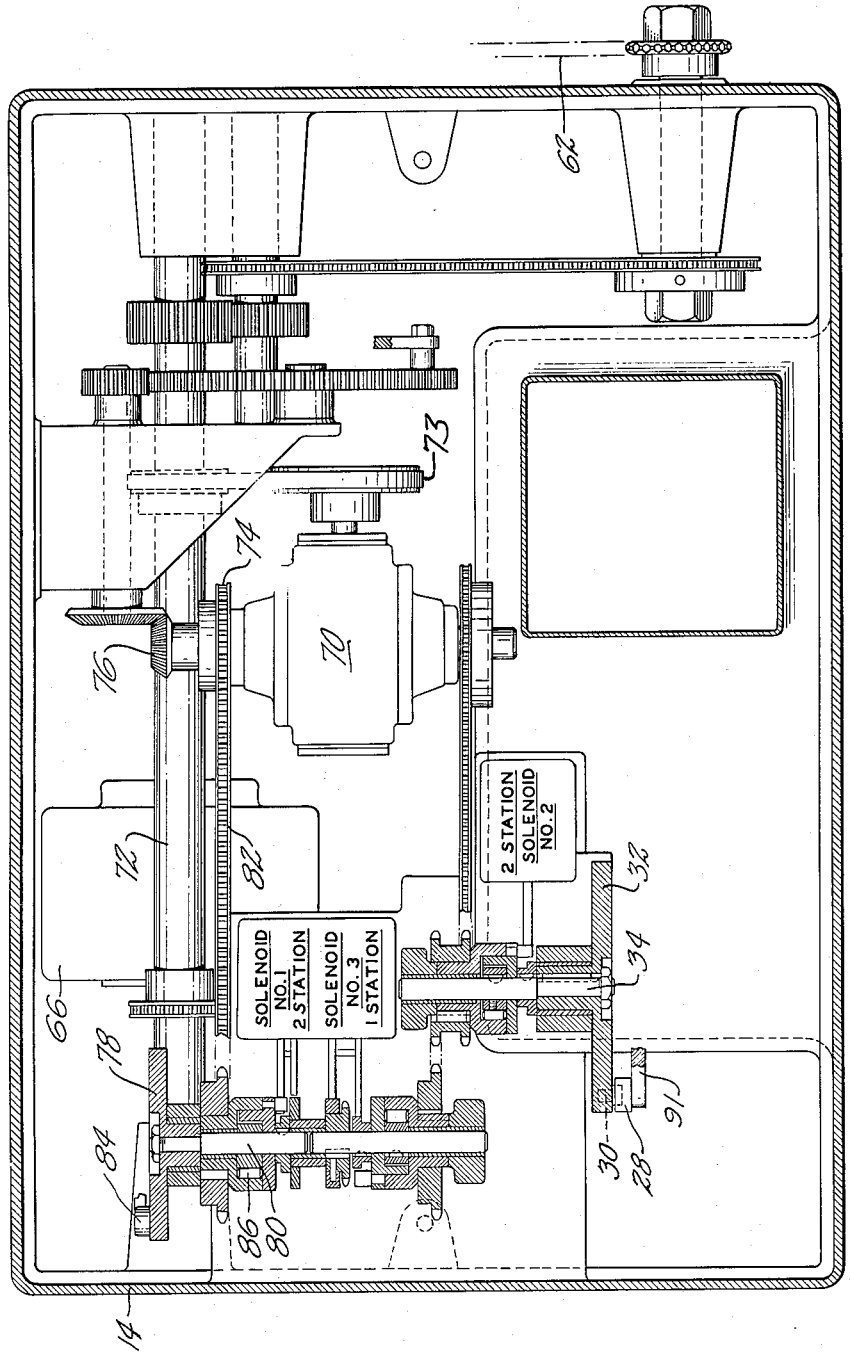
Fig. 4 is a plan view of the driving means for the operating mechanism for the machine, the view being partly in section on the plane of line 4—4, in Fig. 3.

The cutter head 42 briefly referred to above is slidably and pivotally mounted for movement along and oscillated about the axis of a long splined shaft 48 rotatably mounted just above the machine base 14 to move the cutter 50 along and also toward and from the axis of the work blank. Within the cutter head 42 is a short cutter shaft 52 extending parallel to the work spindle 10 and rotatably mounted on spaced antifriction bearings 54 as shown. At one end of the shaft over-hanging the cutting head 42 is the circular milling cutter 50 having a large number of angularly disposed cutting teeth formed on its periphery corresponding to the conformation of thread desired to be cut. This cutter 50 is positioned for cutting operations on a work blank W mounted in the collet chuck 20 on the work spindle 10. At the opposite end of the shaft 52 is a driving gear 56 for the cutter meshing with a gear 58 splined to the shaft 48 about which the cutter head 42 oscillates. To drive the splined shaft 48 a sprocket wheel 60 is mounted on its outer end which may be driven by a chain 62 from driving mechanism in the base presently to be described. (See Figs. 1 and 4.)

Automatic loading means indicated at 64 for the work piece W may be provided so that, at the proper period in the cycle of operation of the machine, a blank W, preferably pointed ready for threading may be transferred from a hopper or magazine (not shown) to a position in alignment with the spindle 10 and in a position to be clamped by the collet jaws 22 and rotated by the spindle 10. This loading device 64 to transfer the blanks W from a hopper and position them on the spindle 10 may also include a preliminary pointing device (not shown) for the blanks and will form the subject matter of another application covering the magazine transferring mechanism and pointing device.

The drives for the above described spindle 10 and for cutter rotating shaft 48 are housed within the base (see Figs. 2 and 4) and are operated by a motor 66 which drives the two sprocket chains 38 and 62 referred to above through suitable driving connections. The motor 66 is drivingly connected to a speed reducer 70 through connections from the motor to a shaft 72 extending longitudinally within the base 14 and by a belt 73 from shaft 72 to the reducer 70. The driven members of the speed reducer 70 are shafts which rotate at relatively low speed. One of these driven shafts has a sprocket wheel 74 and a bevel gear 76 secured thereon. The sprocket wheel 74 drives a disk 78 on a short shaft 80 aligned with a second section by means of a suitable chain 82, and on the disk 78 is eccentrically mounted a pin 84 extending from one side. Rotation of this disk 78 and pin 84 serves to raise and lower the cutter head 42 by means of connections presently to be described. The rotation of the disk 78 by the driven shaft 80 is stopped and started by means of a solenoid controlled Hilliard type one revolution clutch 86. When the solenoid of clutch 86 is not energized the outer member of clutch and sprocket rotate idly but the disk 78 remains stationary; as soon as the solenoid is energized the disk 78 makes approximately a half revolution and oscillates shaft 89 connected to the disk pin 84 by a connecting link 90. Oscillation of the shaft 89 raises or lowers a horizontal bar or rail 92 on the front of the base 14 by a pair of parallel links shown in Figs. 1 and 5. By means presently to be described the cutter head 42 is moved about the axis of shaft 48 by movement upward of the bar or rail 92 to place the cutter 50 in operative position for cutting the straight portion of the thread on the blank while permitting the cutter head to move axially along the machine.

To periodically rotate the disk 32 to oscillate arm 28 to open and close the collect and to move the back rest into and out of blank supporting position, a Hilliard type of one revolution clutch is used on shaft 34. The clutch is normally disengaged so that the shaft 34 is normally stationary. When switch No. 2 operates its solenoid No. 2 the shaft 34 is clutched for approximately a half revolution and then disengaged. Similarly the disk 78 is rotated with its shaft 80 a half revolution by a similar type clutch when its solenoid is energized.

The operation of the machine will now be described.

Figure 14:
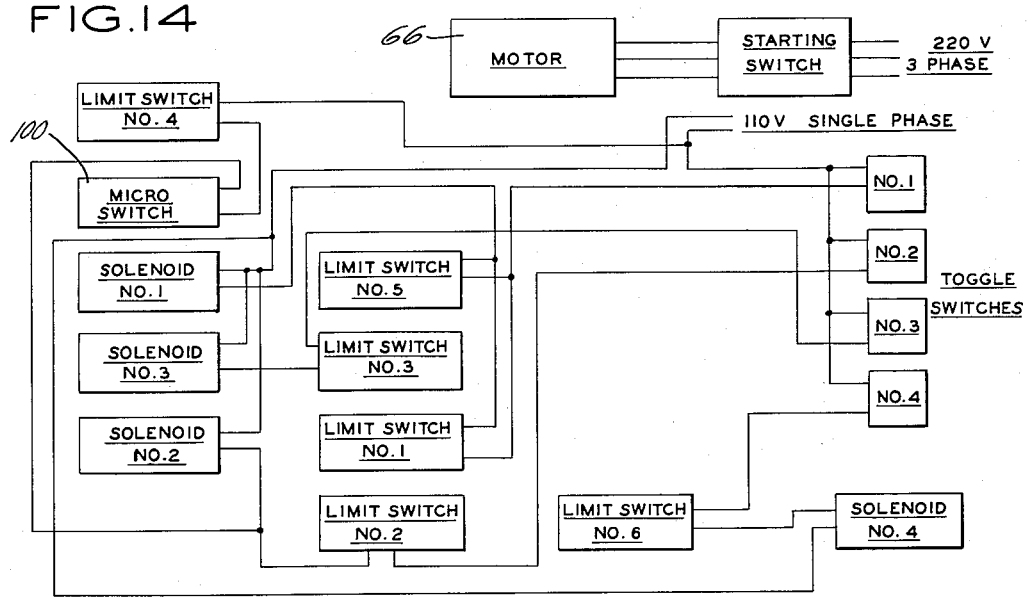
Fig. 14 is a diagram of the electrical circuits.
Figure 10:
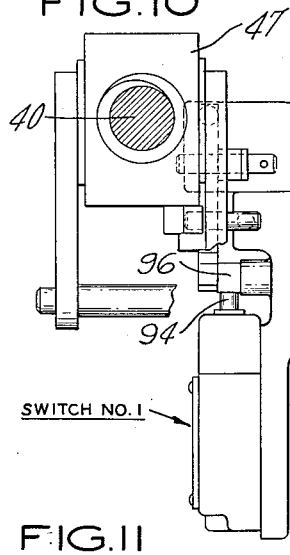
Fig. 10 is a vertical transverse sectional view of the traversing means for the cutter head.

With the motor 66 rotating and with cutter head 42 in its lower and inoperative position adjacent the chuck 20 ready for cutting a work blank W mounted on the spindle 10 and clamped by the collet chuck the cutter head 42 is first raised to operative position by solenoid No. 1 operated by switch No. 5. The cutter head 42 is then traversed away from the chuck. This movement of the head 42 is in timed relation to the rotation of the blank W on the spindle 10 to form the screw threads on the blank W. At this time the half-nuts 46 connected to the cutter head 42 as above described are engaged on the constantly rotating lead screw 40 to effect the axial traverse movement of the cutter head. This traversing movement continues to the right until the shank and gimlet point of the screw have been completely threaded. Before the cutter head 42 is returned by weight 98 to its initial or left hand position the head completes its movement downward by solenoid No. 1 operated by switch No. 1 which is in parallel with switch No. 5 (see diagram, Fig. 14). During this downward movement the half-nuts remain closed. Completion of the downward movement of the head closes switch No. 2 which energizes solenoid No. 2 to open the collet chuck 20 and release the completely threaded work piece W. When the cutter head 42 reaches its lowest position the half-nuts 46 are released to permit the weight 98 to return the head. The switch No. 1, indicated by No. 94, is then depressed by the half-nut assembly or cage 47 engaging an adjustable stop 96 on the front surface of the base 14 to release the solenoid holding the cutter head 42 in its cutting position. The weight 98 then returns the cutter head 42 to its left hand position. Switch No. 1 operating its solenoid No. 1 moves cutter head 42 down as shown in Figs. 1 and 10, its solenoid being shown in Fig. 4.

To limit the position of the cutter head 42 to the left at the end of its return movement an adjustable stop 97 is provided (see Fig. 3). This stop is on the end of an elongated screw 99 which may be adjusted to any outward position and locked in position by lock nut 101. Moving with the cutter head 42 axially is the shaft 103 on the outer end of which is an abutment 105. As soon as the half-nuts 46 open the lead screw 40 is released from the sleeve 44 and rod 103 so that these members 103 and 105 and the cutter head 42 can move to the left until they reach the position with abutment 105 against the adjustable stop 97.

Figure 1:
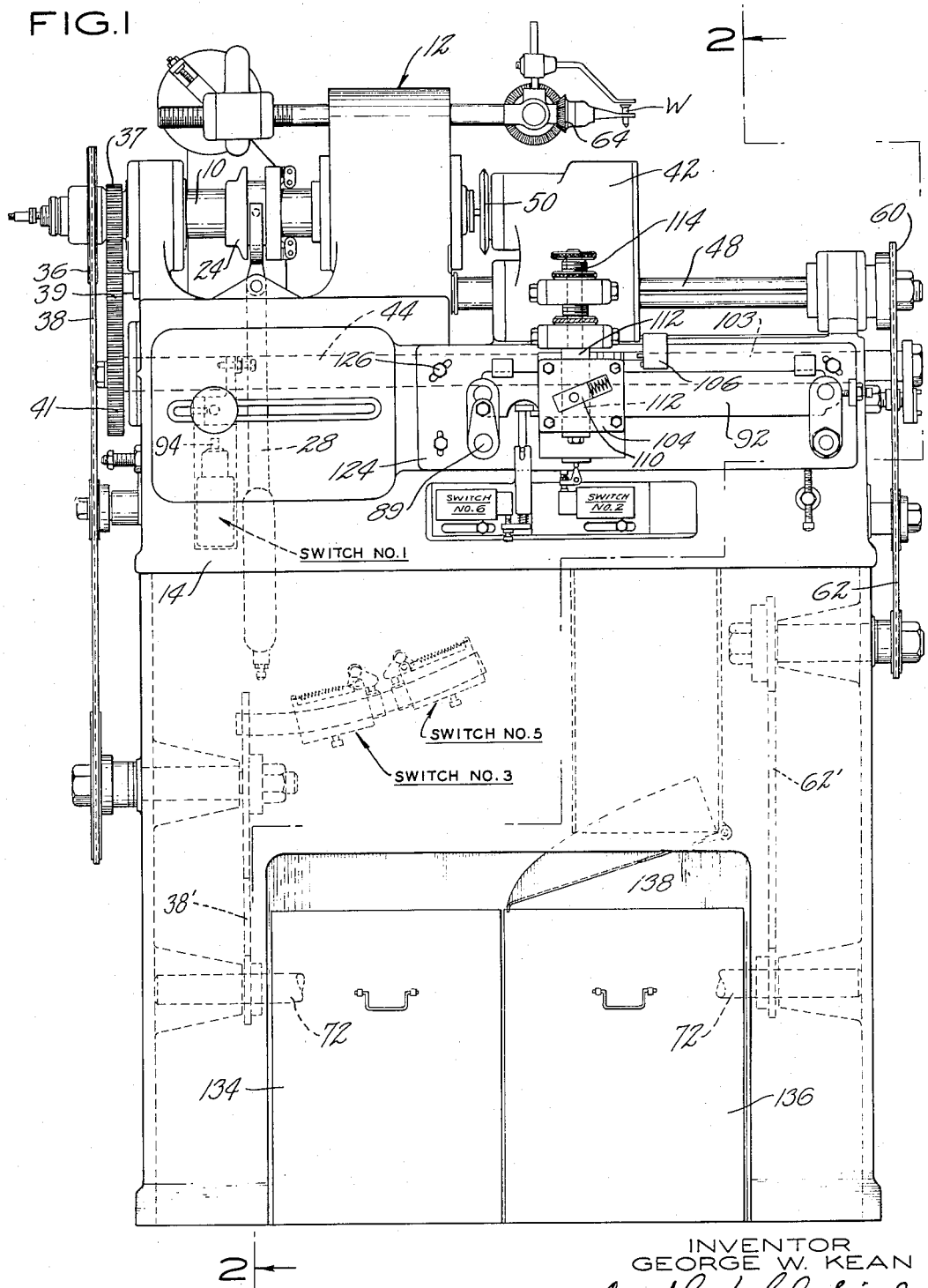
Fig. 1 is a front elevation of a complete wood screw threading machine with the cutter head and cutter in operative or cutting position.

After the cutter head 42 has reached its lower or inoperative position and started on its return stroke, switch No. 2 operates a solenoid to open the collet 20 to release the blank W from the spindle (see Fig. 1).

As soon thereafter as the collet opening movement of the lever 28 has been completed, switch No. 3 actuates a solenoid to start operation of the blank transferring means 64 which moves a blank W to its position in alignment with the spindle 10. When the blank W has been moved into position switch No. 4 is closed by contact with the transfer member which in turn moves the collet closing lever 28 in a direction to close the collet 20. With the collet operating lever 28 moved to its collet closing position, switch No. 5 is closed and operates a solenoid to raise the cutter head 42 into its cutting position. As soon as the cutter head 42 has reached its cutting position switch No. 6 is closed and operates solenoid No. 4 to close the half-nuts 46 on the lead screw 40 to start the cutting operation by axial traverse movement of the cutter head 42. When the cutting operation has been completed the cycle is repeated.

Figure 13:
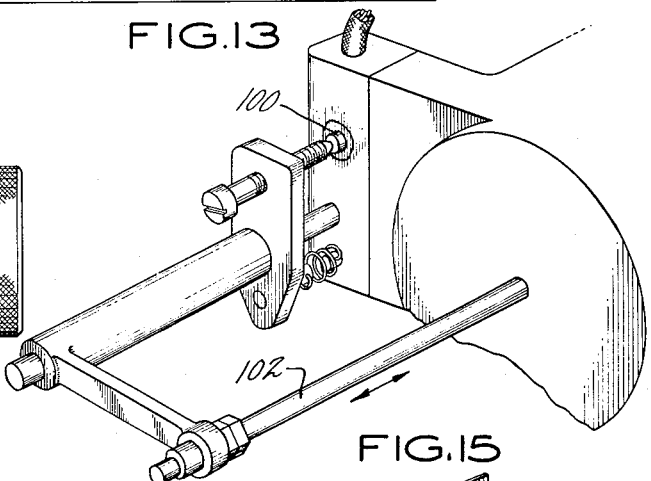
Fig. 13 is a perspective view showing a control rod extending from the headstock and one of the cycle controlling switches.

Another switch 100 (see Fig. 13) is inserted in the circuit for the collet closing operation operated by a rod 102 extending through the work spindle 10. When a blank W is moved into position by the transfer mechanism 64, the blank W abuts against and forces the rod 102 toward the outer left hand end of the spindle 10. This movement of the rod 102 moves the switch button 100 to its circuit closing position so that the cycle of operations may continue. If no blank has been moved into position on the work spindle 10 the switch 100 remains open and the collet closing operation cannot take place. Operation of the machine is therefore discontinued.

Figure 5:
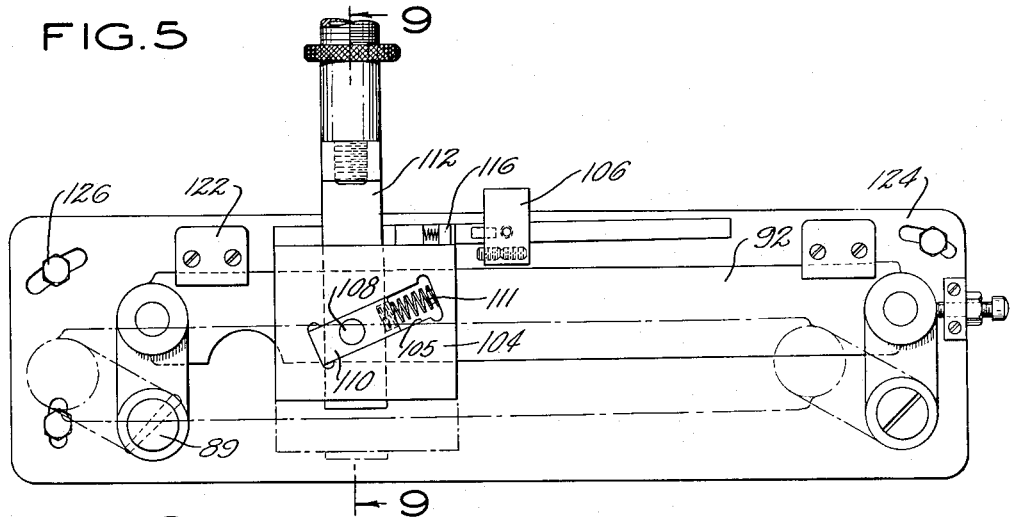
Fig. 5 is a front elevation showing the means for moving the cutter head into and out of its cutting position and for varying its cutting position radially of the work during its axial traversing movement to form the pointed end of the screw being threaded.
Figure 9:
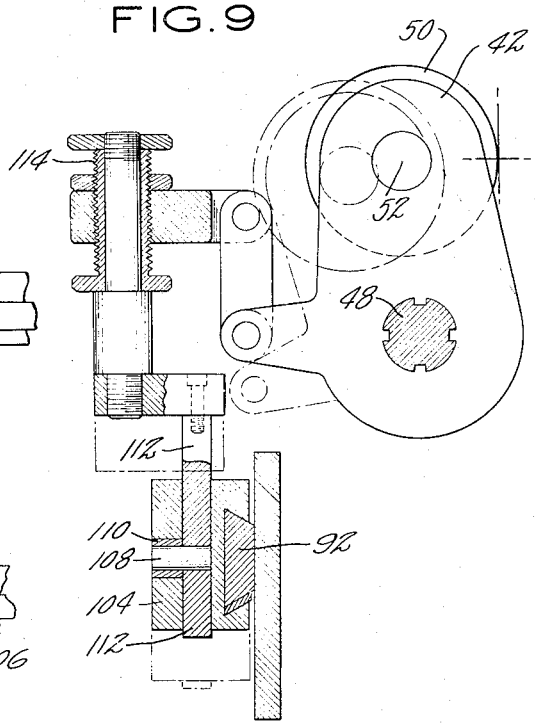
Fig. 9 is a transverse vertical sectional view taken on the plane of line 9—9 in Fig. 5.

During the cutting of the straight or shank portion of the threads, a block 104 strikes an adjustable stop or abutment 106 (see Figs. 1 and 5). Continued axial movement of the cutter head 42 moves a pin 108 and shoe member 110 obliquely upward within a slot formed in the block 104. Pin 108 is mounted in the lower end of a vertically movable bar 112 so that as the pin 108 and shoe member 110 move within the oblique slot in block 104 the bar 112 is raised or lowered. Vertical movement of bar 112 moves a threaded sleeve 114 connected to the cutter head 42 as shown in Fig. 9. Movement along the slot in block 104 of shoe member 110 during the cutting operation advances the cutter toward the spindle axis to form the threaded pointed end of the screw. By manual rotation of the threaded sleeve 114 the position of the cutter can be radially adjusted. A spring 111 pressing against one end face of the obliquely movable member 110 returns this member to its normal or left hand position in the slot in block 104 as soon as the half-nuts 46 engaging the lead screws 40 are released.

Figure 6:
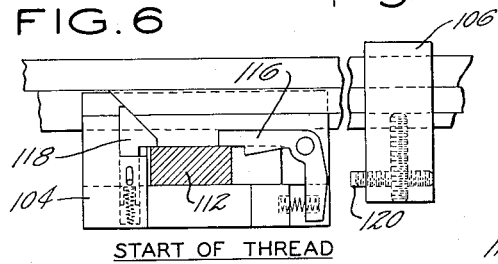
Figs. 6, 7 and 8 are horizontal views partly in section showing the relative positions of some of the members shown in Fig. 5.
Figure 7:
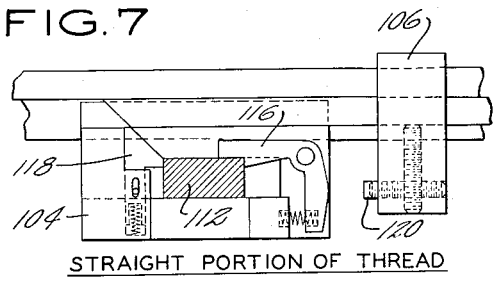
Figure 8:
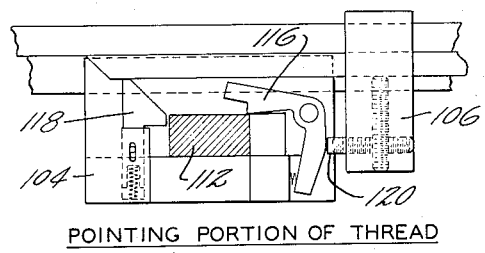

Prior to cutting the straight portion of the threads on the shank of a blank the cutter 50 must be slowly advanced to the proper depth of cut. This inward movement of the cutter 50 is preferably effected in one rotation of the blank W. The mechanism for this purpose is shown in Figs. 6, 7 and 8. At the start of the cutting operation the block 104 and member 112 are as shown in Figs. 5 and 6. The first movement axially of the cutter head 42 moves the vertical bar 112 laterally a short distance within the horizontal bar or rail 92. This initial movement of the cutter head 42 moves the bar 112 against a latch or bell crank 116 and moves locking member 118 from its position shown in Fig. 6 to that shown in Fig. 7. As soon as the position of the parts shown in Fig. 7 is reached, the parts and block 104 move together until latch 116 is oscillated by engagement with a stop 120. Subsequent movement of the cutter head 42 with the block 104 retained by the stop 120 is by movement of the bar 112 to the right within the block 104. This movement moves shoe member 110 along the oblique slot 105 in the block 104 and forms the threaded point of the blank W.

It will be understood that by varying the adjustment of the abutment on screw 99, which determines the initial position of the cutter head 42, and the stop 106, the length of the threaded portion of the screw may be widely varied.

As shown in Fig. 5 the rail 92 and adjacent parts are mounted on a plate 124 secured to the front face of the base 14. To adjust the angular position of this plate 124 to position the rail 92 properly for parallel threads the plate may be pivotally mounted for movement about the axis of shaft 89 and locked in position by clamping bolts or screws 126 in arcuate slots formed at the opposite ends of the plate.

Figure 2:
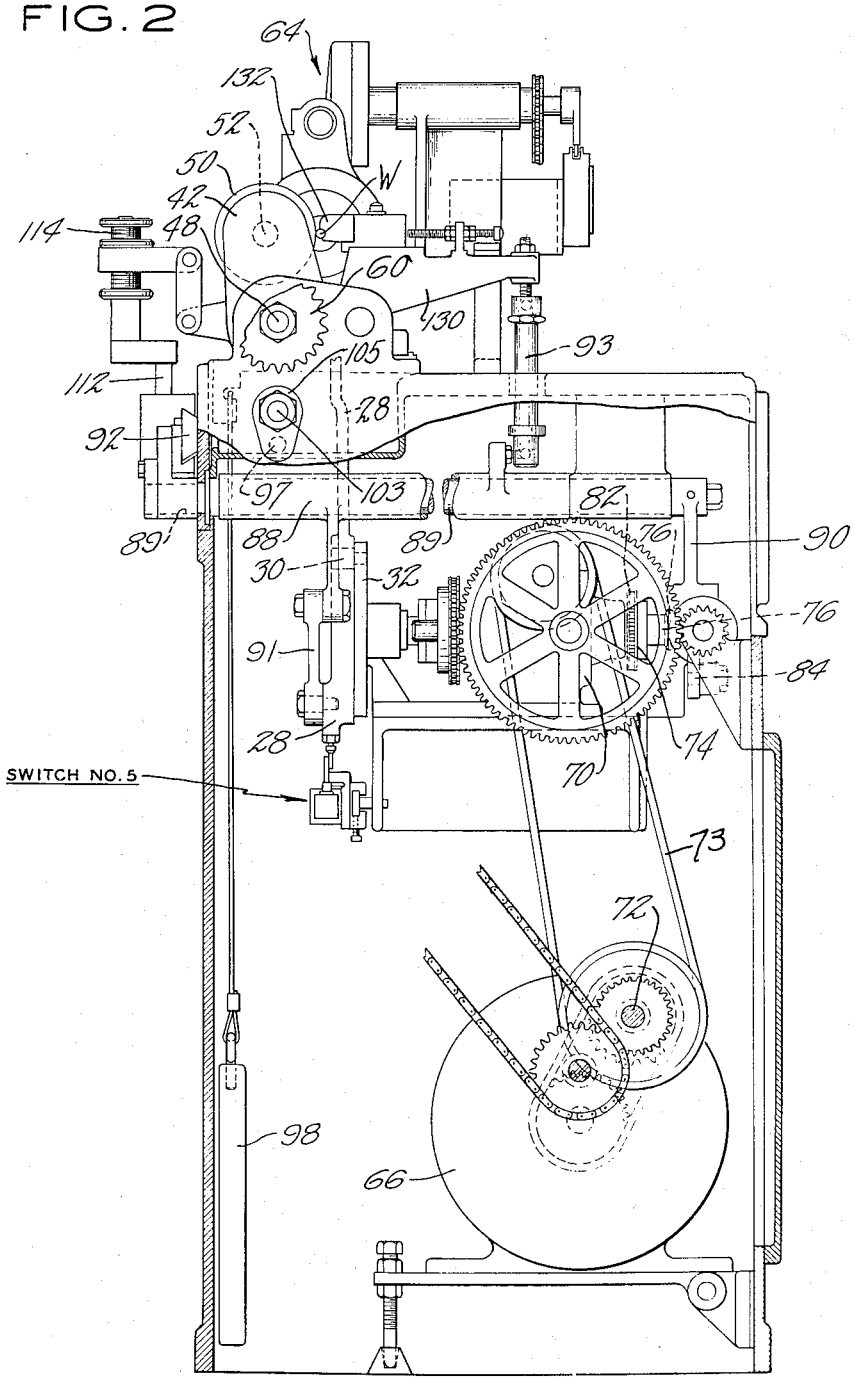
Fig. 2 is an elevation of the machine shown in Fig. 1, the view being taken substantially on the plane of line 2—2 on Fig. 1.

During the threading of slender or elongated wood screws it is desirable to support the blank W laterally to resist the tendency to lateral deflection by pressure of the cutter. For this purpose a steady rest is provided to bear against the rear of the blank W directly opposite the cutter 50. This is shown in Fig. 2. An arm 130 pivoted to the base is raised and lowered to advance a bearing block 132 adjustably mounted on its upper surface. The forward end of this block bears directly against and supports the blank W against deflection by the pressure of the cutter 50. To advance this back rest 132 sleeve 88 is oscillated by reach arm 91 actuated by movement of the collet closing arm 28. This oscillating movement of sleeve 88 which surrounds shaft 89 raises an adjustable member 93 connected at its lower end to an arm on the sleeve 88 by a ball and socket joint and at its upper end by another ball and socket joint to the pivotal arm 130 on which the bearing block 132 is mounted. As soon therefore as the collet 20 is closed with a work blank W in position the bearing block 132 is advanced into its supporting position. When arm 28 is moved in the direction to open the collet the arm 28 oscillates sleeve 88 and its arm 130 in a direction to withdraw the bearing block 132 from its blank supporting position.

Figure 15:
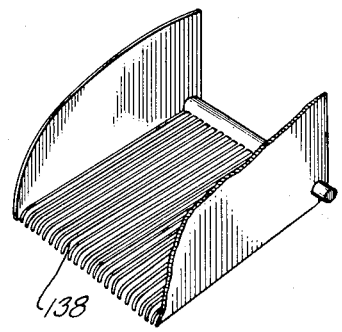
Fig. 15 shows a member for separating the chips from the completed screws.

Within the base 14 of the machine containers 134 and 136 are placed, one for the threaded screws and the other for the chips or cuttings and for any lubricant that may be used on the cutter 50. Directly above the chips container 136 is a screen member 138 suitably pivoted along one edge to the machine base 14. The screen member 138 may be made as shown in Fig. 15 by extended arms or fingers closely spaced apart so that between them the cuttings may drop into the container 136 and the completed screws may ride downward along the arms and fall into the other container 134. Coolant which may be used with the machine falls into container 136 with the chips and is recirculated by a suitable pump.

I claim as my invention:

1. A wood screw threading and pointing machine comprising a base, a work supporting and rotating spindle, a cutter head, operating mechanism for moving said cutter head along said base and for moving said cutter head toward and from said spindle, said mechanism comprising a vertically movable horizontally disposed bar on said base movable to predetermined vertical positions, a member slidable on said bar with movement of said cutter head along said base, supplemental means mounted on said member and relatively movable with respect thereto for creating a movement obliquely thereof, adjustable means connected to said head, means connecting said supplemental means to said adjustable means, whereby said head moves said supplemental means and member along said bar, and means to stop said member on said bar at a predetermined point along said bar, whereby the movement of said member is stopped and said supplemental means is caused to move with respect thereto.

2. A wood screw threading and pointing machine comprising a base, a work supporting and rotating spindle, a cutter head, operating mechanism for moving said cutter head along said base and for oscillating said cutter head toward and from said spindle about an axis parallel to said spindle, said mechanism comprising a vertically movable horizontally disposed bar on said base movable to predetermined parallel position at the beginning and end of the movement of said head along said base, a member slidable on said bar with movement of said cutter head along said base, a slide mounted on said member for movement obliquely thereon, adjustable means connected to said head, means connecting said slide to said adjustable means, whereby said head moves said slide and member along said bar, and means to stop said member on said bar at a predetermined point along said bar, whereby when movement of said member is stopped said slide is caused to move with respect thereto.

3. A wood screw threading and pointing machine comprising a base, a work supporting and rotating spindle, a cutter head, operating mechanism for moving said cutter head along said base and for moving said cutter head toward and from said spindle at the beginning and end of the movement along said base of said member, said mechanism comprising a vertically movable horizontally disposed bar on said base movable to predetermined vertical positions, a member slidable on said bar with movement of said cutter head along said base, supplemental means mounted on said member and relatively movable with respect thereto for creating a movement obliquely thereof, adjustable means connected to said head, means connecting said supplemental means to said adjustable means, whereby said head moves said supplemental means and member along said bar, and means to stop said member on said bar at a predetermined point along said bar, whereby the movement of said member is stopped and said supplemental means is caused to move with respect thereto.

4. A wood screw threading and pointing machine comprising a base, a work supporting and rotating spindle, a cutter head, operating mechanism for moving said cutter head along said base and for oscillating said cutter head toward and from said spindle about an axis parallel to said spindle, said mechanism comprising a vertically movable horizontally disposed bar on said base movable to predetermined parallel position, a member slidable on said bar with movement of said cutter head along said base, a slide mounted on said member for movement obliquely thereon, adjustable means connected to said head, means connecting said slide to said adjustable means, whereby said head moves said slide and member along said bar, and means to stop said member on said bar at a predetermined point along said bar, whereby when movement of said member is stopped said slide is caused to move with respect thereto.

References Cited in the file of this patent
UNITED STATES PATENTS

| | | |
|---|---|---|
| 145,136 | Thurston | Dec. 2, 1873 |
| 688,515 | Hanson | Dec. 10, 1901 |
| 760,301 | Berry | May 17, 1904 |
| 1,188,469 | Mason et al. | June 27, 1916 |
| 2,216,019 | Trundle | Feb. 13, 1917 |
| 1,273,904 | Muller | July 30, 1918 |
| 1,659,247 | Doane | Feb. 14, 1928 |
| 2,176,676 | Lupo | Oct. 17, 1939 |
| 2,405,485 | Barkstrom et al. | Aug. 6, 1946 |